(12) United States Patent
Bardelli

(10) Patent No.: US 8,575,242 B2
(45) Date of Patent: Nov. 5, 2013

(54) COATING OF ORGANIC AND INORGANIC PIGMENTS WITH ACRYLIC RESINS

(75) Inventor: Achille Angelo Bardelli, Buguggiate (IT)

(73) Assignee: PPG Industries Ohio, Inc., Cleveland, OH (US)

( * ) Notice: Subject to any disclaimer, the term of this patent is extended or adjusted under 35 U.S.C. 154(b) by 321 days.

(21) Appl. No.: 12/160,525

(22) PCT Filed: Jan. 16, 2006

(86) PCT No.: PCT/IT2006/000019
§ 371 (c)(1),
(2), (4) Date: Jul. 16, 2010

(87) PCT Pub. No.: WO2007/080612
PCT Pub. Date: Jul. 19, 2007

(65) Prior Publication Data
US 2010/0298472 A1 Nov. 25, 2010

(51) Int. Cl.
| C09B 67/08 | (2006.01) |
|---|---|
| C09B 67/00 | (2006.01) |
| C08K 5/34 | (2006.01) |
| C08K 5/00 | (2006.01) |
| C08K 3/00 | (2006.01) |
| C08L 31/02 | (2006.01) |
| C09D 5/02 | (2006.01) |
| A61K 9/16 | (2006.01) |

(52) U.S. Cl.
USPC ........... 524/88; 524/81; 524/86; 524/87; 524/401; 524/423; 524/502; 524/543; 524/556

(58) Field of Classification Search
USPC ......... 524/81, 88, 401, 86, 87, 423, 502, 543, 524/556
See application file for complete search history.

(56) References Cited

U.S. PATENT DOCUMENTS

| 2,913,348 | A |  | 11/1959 | Jackson |  |
|---|---|---|---|---|---|
| 3,112,289 | A |  | 11/1963 | Stocker |  |
| 3,849,150 | A |  | 11/1974 | Schrempp et al. |  |
| 4,049,615 | A |  | 9/1977 | Elsener et al. |  |
| 4,464,203 | A |  | 8/1984 | Belde et al. |  |
| 4,624,678 | A |  | 11/1986 | Schneider |  |
| 4,664,711 | A |  | 5/1987 | Kawaguchi et al. |  |
| 5,106,417 | A |  | 4/1992 | Hauser et al. |  |
| 5,182,324 | A |  | 1/1993 | Osada et al. |  |
| 5,411,802 | A |  | 5/1995 | Kumar et al. |  |
| 6,051,060 | A | * | 4/2000 | Mizobuchi | 106/499 |
| 6,114,434 | A | * | 9/2000 | Tuemmler et al. | 524/512 |
| 6,646,023 | B1 |  | 11/2003 | Nyssen |  |
| 6,734,231 | B2 |  | 5/2004 | Creusen et al. |  |
| 2003/0018119 | A1 | * | 1/2003 | Frenkel et al. | 524/502 |
| 2004/0022749 | A1 |  | 2/2004 | Malnou |  |
| 2004/0102545 | A1 | * | 5/2004 | Robeson et al. | 523/412 |
| 2005/0090609 | A1 |  | 4/2005 | Reisacher |  |

FOREIGN PATENT DOCUMENTS

| DE | 272892 A1 | * | 1/1978 |
|---|---|---|---|
| DE | 4200459 A1 |  | 7/1992 |
| DE | 19813394 A1 |  | 9/1999 |
| EP | 0425439 A2 |  | 5/1991 |
| EP | 0432480 A2 |  | 6/1991 |
| EP | 1118645 A |  | 7/2001 |
| EP | 1566419 A |  | 8/2005 |
| GB | 1224627 A |  | 3/1971 |
| GB | 1588777 A |  | 4/1981 |
| JP | 1174591 A |  | 7/1989 |
| JP | 2004018827 A |  | 1/2004 |
| RU | 2152414 C1 | * | 7/2000 |
| WO | WO 99/28390 A |  | 6/1999 |
| WO | 0121371 A1 |  | 3/2001 |
| WO | WO 03064540 A1 | * | 8/2003 |
| WO | 2004074382 A2 |  | 9/2004 |
| WO | 2004078852 A1 |  | 9/2004 |
| WO | 2005054381 A1 |  | 6/2005 |
| WO | 2005080514 A1 |  | 9/2005 |
| WO | 2006082603 A1 |  | 8/2006 |
| WO | 2007007359 A1 |  | 1/2007 |
| WO | 2007080612 A1 |  | 7/2007 |
| WO | 2008012848 A1 |  | 1/2008 |

OTHER PUBLICATIONS

"PCT International Search Report dated Jan. 23, 2007 for PCT/IT2006/000019, from which the instant application is based," 3 pgs.
"PCT Written Opinion dated Jan. 23, 2007 for PCT/IT2006/000019, from which the instant application is based," 5 pgs.
"PCT International Preliminary Report on Patentability dated Feb. 1, 2008, from which the instant application is based," 10 pgs.

* cited by examiner

Primary Examiner — Karuna P Reddy
(74) Attorney, Agent, or Firm — Christine W. Trebilcock

(57) ABSTRACT

Coating of organic and inorganic pigments with acrylic resins, comprising a chemical compound consisting of particles of solid organic and inorganic substances, both defined as pigments, in that they are substances which absorb a fraction of the light and reflect the complementary part thereof, coated with acrylic and, optionally, aldehyde and/or ketone resins. The latter are deposited on the surface of the pigment by means of a process which envisages melting of the resin, consequent wetting and coating of the entire surface of the pigment with the resin in the melted state, the consequent cooling and subsequent step of grinding by means of mechanical systems operating in temperature conditions lower than 20° C., by means of cryogenic processes or granulate by means of a wet method with a water jet cutting action and separation of the granulates by the water on a vibrating screen and then dried on a spiral elevator. The product resulting from this invention will be used as a semifinished product for the coloring and pigmentation of powder paints and plastics as a monochromatic coloring material and or will also be used, after dissolving in a solvent, or in water with basic pH, as a pigmented paste or directly in solvent or water based resins in the liquid paints industry.

19 Claims, 2 Drawing Sheets

COATING OF ORGANIC AND INORGANIC PIGMENTS WITH ACRYLIC RESINS

RELATED APPLICATIONS

This application claims priority to International Application No. PCT/IT2006/000019 filed Jan. 16, 2006, the teachings of which are incorporated herein by reference.

The present invention relates to a coating of organic and inorganic pigments preferably with acrylic resins, to provide a composition preferably in the form of granules, and also relates to the associated production process.

As is known, pigments are solids of both organic and inorganic nature, which are defined as such when they are used within a fixing system such as resins, absorbing part of the light and reflecting the complementary part thereof which forms the colour of the coated surface.

As such, they are solids with a very irregular surface, which differs from pigment to pigment, and with property to interface with other substances completely different from each other and greatly influenced by the physical and chemical conditions of the contact elements.

The difficulties of incorporating pigments in vehicle systems based on a wide range of resins are well known.

This is true both in the case of powder systems, where contact of the pigment occurs with a polymer resin in the melted state inside an extruder, and in the case of liquid systems where interfacing occurs with polymers (resins) in form of solution, emulsion or dispersion diluted both with solvents and/or water, which have a flocculating effect on the system.

At present in powder paint formulations the introduction of the pigments is performed by means of simple physical mixing of the pigments with differently shaped granules (chips or flakes) of the resins which form the vehicle, with the addition of chemical additives able to improve the contact between pigment and resin so that to incorporate the pigment into the resin during the extrusion stage.

In order to facilitate metering of the (colouring) pigment, in many cases the latter is mixed with inert pigments (extenders) in order to dilute the concentration and reduce the risk of metering difficulties in the case of small quantities.

The simultaneous presence of different pigments results in the need to use, in many cases, different types of chemical additives, often having properties which conflict and interfere with each other.

If follows that the development of the colour, resulting from mixing of different pigments, is subject to inconsistency from one preparation to the next due not only to the change in environmental conditions, which differ in each case, but also to the varying properties of the pigment's surface and the surface tension properties of the polymers in the melted state which, even though not differing from batch to batch, may be slightly different.

In the case of liquid paint formulations using organic solvent or water as liquid phase, introduction of the pigments is conventionally performed by mixing the pigments with resin solutions.

The presence of organic solvent and/or water is negative owing to its flocculating properties because tends to make the contact between resin and pigment unstable.

In order to reduce this effect, anti-flocculating chemical additives are normally added to these mixtures of pigments and resins dissolved in a solvent and/or water, these having the property of modifying and adjusting the electrostatic properties of the surfaces of the pigments and modifying the surface tension of the resin solution.

Owing to these negative effects typical of the pigment/resin/solvent system, the colour mixtures may be defined as unstable systems where the chromatic effect of the finished paint can change over time.

Improvements to this system have been made by means of pre-dispersion techniques and corresponding grinding of monopigments to develop pastes, where the pigment is incorporated in specific resins, also of acrylic, aldehyde and ketone nature, but dissolved in organic solvent and/or water and using combinations of chemical additives, in order to interface the surface of the specific pigment with the selected dissolved resin.

U.S. Pat. No. 6,734,231 discloses a pigment composition obtained by mixing a pigment and a urea-aldehyde resin and/or a urea-ketone resin in a homogenizer or in the inlet zone of the extruder, and extruding the thus-obtained mixture.

WO2004/078852 discloses a pigment preparation wherein fine organic pigment particles are combined with inorganic pigment particles, said particles also being provided with an organic macromolecular coating.

EP432-480 discloses masterbatches which comprise three essential components: (a) a resin selected from acrylic resins, ketone or aldehyde resins; (b) citric, acetylcitric or tartaric acid esters; (c) dyes and/or pigments and additives.

The pigment compositions disclosed in the above cited prior art documents are not however suitable to be used in water-based paints. Furthermore, the composition disclosed in EP432-480 will result, when using citric, acetyl citric or tartaric acid esters of glycols or polyalkylenglycols containing between 10 and 30 monomers, in a soft compound, which, contrarily to the information reported therein, is very difficult to be handled and grinded.

The aim of the present invention is to provide a coating which allows the drawbacks of the prior art to be overcome.

In connection with this aim, one object of the invention is to provide a coating in the form of a particle composition (chips, flakes, powder and/or granule) which may be used as:
  a semifinished product for the tinting and pigmentation of powder paints (metering of small quantities as substitution for master batches of pigments and extenders)
  or, after dissolution in an organic solvent or in water with basic pH, a pigmented paste to be used as post tinting in the liquid paints industry.

Another object is that of providing a coating in the form of granules, chips, flakes or in powder form which can be used as a substitution for mixtures of organic and inorganic pigments for pigmenting powder and liquid paints, overcoming the difficulties which are typically encountered in the use of bare pigments according to the prior art.

In particular, the granular composition of the present invention may be used as a semifinished product in powder paint formulations, as an alternative to the pure pigments which are not pre-coated. With their use it is possible to achieve more continuity in terms of colour development and batch to batch colour reproducibilty of the colouring system and a reduction in the quantity of pigment originally used due to the higher colorimetric yeld that precoated pigments have. The granular form, moreover, facilitates automated transportation of the material, metering and drastically reduces dust pollution.

The product resulting from this invention will be used: as a semifinished product for the tinting and pigmentation of powder paints or also used, after dissolving in a organic solvent, or in water with basic pH; as a pigmented paste in the liquid paints both organic or water solvent based industry as direct substitution for pigments; for tinting of finished paints or for pigmenting and therefore colouring both thermoplastic and thermosetting plastics (e.g. polyethylene, polypropylene, polyethylene terephthalate PET, acrylonitrile-butadiene-styrene ABS, as well as polyurethanes of different composition, and reinforced and unreinforced polyamides of different composition).

In particular, compared to the coatings known in the art, the granular composition of the present invention is completely dust-free, has a high colorimetric yield (with a consequent reduction in the cost of colouring), has optimum dispersion (i.e. no flocculation), easy dissolution properties and is characterized by a high compatibility (i.e. may be used in different polymer systems, such as for example in powder paints, liquid paints both organic or water solvent based and in plastics).

These and other objects, which will appear more clearly below, are achieved by a coating of organic or inorganic pigments with acrylic resins, characterized in that it comprises a chemical compound consisting of particles of solid organic and/or inorganic substances, both defined pigments, and acrylic resins deposited on its surface.

The subject of the present invention therefore consists of a particle composition essentially consisting of organic and/or inorganic pigments coated with at least one acrylic resin, said resin having an acidity number higher than 30, preferably higher than 50, an average molecular weight of between 800 and 5000, preferably of between 800 and 3000 Da and melting point of between 70° and 130° C.

The at least one acrylic resin may also be combined with at least one aldehyde and/or ketone resin, preferably having an average molecular weight of between 800 and 2000 Da and melting point of between 70° and 130° C.

For the purpose of the present invention the term "acrylic resin" is mainly understood as meaning a water soluble poly addition product of styrene, maleic anydride, methyl meta acrylic monomers and acrylic monomers, including acid and ester and also containing hydroxy (propyl) function.

The polymerisation could occur
1) in solvent followed by stripping of solvents, i.e. by distillation or via thin film evaporation (LUVA);
2) or directly in emulsion in water phase;
3) or by dispersion of solution polymer in water phase.

In both latter cases, a spray dry process to obtain the solid resin should be used.

The term "acidity number" indicates the average number of carboxy groups/resin unit.

The term "aldehyde and/or ketone resin" is understood as meaning a condensation product of an aldehyde (preferably aliphatic aldehyde) or a ketone (preferably cyclohexanone or methylcyclohexanone), optionally with condensation products such as urea or formaldehyde.

These resins are well-known in liquid paint formulations both using an organic and/or water solvent phase, by mixing the pigments with resin solutions.

Examples of acrylic resins are, for example, the products distributed by Joncryl Polymers such as: Joncryl® 67 and 690; Joncryl® 586,611 and 678; Styrene Maleic Anydride copolymers distributed by Sartomer such as SMA® 1000, 2000 and 3000 and their esters SMA® 1440, 17352, 2625 and 3840.
Examples of aldehyde or ketone resins are, for example, the products distributed by BASF such as Laropal®, which is incorporated herein by way of reference; in particular, Laropal® A 101 and A 81 are condensation products of urea and aliphatic aldehydes while Laropal® K 80 is the condensation product of cyclohexanone. Laropal® LR 9008 is an aqueous solution of modified aldehyde resin.

According to a preferential aspect of the invention, the acrylic resin has an acidity number higher than 100, an average molecular weight of between 900 and 2000 Da and/or a melting point of between 85° and 120° C.; the aldehyde and/or ketone resins have an average molecular weight of between 900 and 1400 Da and melting point of between 90° and 110° C.

The composition of the present invention normally comprises from 80% to 20% by weight of pigment and from 80 to 20% by weight of resin and may contain excipients and/or adjuvants such as mineral reinforcing fillers (extenders) and/or additives like dispersants, surfactants, wetting agents, anti-settling and tixotrophic agents (the term "resin" is herein understood as meaning the at least one acrylic resin optionally in admixture with the at least one aldehyde and/or ketone resin in the range of 10 to 90% of acrylic resin and 90 to 10% of aldehyde and/or ketone resin, by weight).

The term "essentially consisting of" means that, apart from the inorganic and/or organic pigment and the resin, the composition of the present invention may contain reinforcing fillers (preferably of mineral origin) and/or additives in amounts comprised of between 10 to 35% by weight of the composition, preferably from 20 to 30% by weight.

In the case of inorganic pigments, the composition preferably consists of 50 to 70% by weight of pigment and 30% to 50% by weight of resin, even more preferably 55 to 65% by weight of pigment and 35 to 45% by weight of resin (the presence of mineral reinforcing fillers and/or additives being however not excluded).

In the case of organic pigments, it preferably consists of 15 to 40% by weight of pigment, 45 to 75% by weight of resin, up to 20% by weight of mineral reinforcing fillers (extenders) and 0.1 to 10% by weight of additives, even more preferably 20 to 35% by weight of pigment, 50 to 70% by weight of resin, 5 to 15% by weight of inert fillers (extenders) and 1 to 7% by weight of additives.

From among the mineral reinforcing fillers (extenders), barium sulphate is preferably used; the dispersants may be selected from among epoxidized soybean oils and sorbitan esters; preferably ethoxylated sorbitan ester, marketed by Uniqema as Atmer 116™, is used.

In particular it has been found that the presence of epoxidized soybean oils and sorbitan esters, such as ethoxylated sorbitan ester, is particularly advantageous for having a homogeneous flow in the extruder and, consequently, for obtaining a final product with the desired properties.

In case of compositions containing dispersants and/or extenders, the composition may contain up to 20% by weight of water, preferably from 5 to 15%, which is then evaporated during the extrusion.

When the composition of the present invention is intended for manufacturing water-based paints, the aldehyde and/or ketone resins (when present) are preferably of water-soluble type; otherwise they are in amounts lower than 30% by weight of the acrylic resin, preferably lower than 20%. In particular, when they are water-soluble and in liquid form at room temperature, they may also be used for replacing the water which is normally added before extruding.

The composition in question may be in the form of powder or granules. In the first case, the particles of powder may have dimensions of between 5 and 200µ; in the second case, the granules may have a length of between 0.2 and 8.8 mm and diameter of between 0.4 and 2.2 mm, preferably a length of between 1.8 and 2.2 mm and diameter of between 1.0 and 1.8 mm; according to one of the possible embodiments of the invention, the composition contains 80 to 1000 granules per gram thereof.

The particle formulation according to the present invention may be produced by means of a method, the first two steps of which are unvaried, irrespective as to whether the final product is in the form of granules rather than powder.

The pigment is mixed with the resin inside a container suitable for mixing powders and granulates.

The present invention includes all those organic and inorganic powders which may be defined as colouring pigments or substances which absorb part or all of the light spectrum and reflect the complementary part thereof, forming the visible colour.

The pigments tested, according to the invention, are listed below.

Iron oxide pigments, in all their shades of yellow, brown, red and black; in all their physical forms and grain categories.

Titanium oxide pigments in all the different inorganic surface treatments.

Chromium oxide pigments also co-precipitated with nickel and nickel titanates.

Black pigments from organic combustion.

Blue and green pigments derived from copper phthalocyanine, also chlorinated and brominated, in the various alpha, beta and epsilon crystalline forms.

Yellow pigments derived from lead sulphochromate.

Yellow pigments derived from lead bismuth vandate.

Orange pigments derived from lead sulphochromate molybdate.

Yellow pigments of an organic nature based on arylamides.

Orange pigments of an organic nature based on naphthol.

Orange pigments of an organic nature based on diketopyrrolo-pyrrole.

Red pigments based on manganese salts of azo dyes.

Red pigments based on manganese salts of beta-oxynaphthoic acid.

Red organic quinacridone pigments.

Red organic anthraquinone pigments.

The research work, which was intended to identify from among the various polymers which may be used those suitable for obtaining this pigment coating, resulted in the families of acrylic resins with a molecular weight of between 800 and 3000 Da and with a melting point of between 75° and 130° C.

The present invention relates preferably to the 100% use of polymers which, at the temperature below 40° C., are in the solid state.

The present invention covers all those mixtures of those pigments with these resins where the relative ratio of pigment and resin is between 80 and 20% and vice versa.

The prepared mixture is introduced into a heated-chamber extruder.

The present invention also relates to the use of single-screw and twin-screw extruders with a ratio between length and diameter of more than 24.

The extrusion is preferably performed at an internal temperature of the extruder 5-20° C. higher than the melting temperature of the acrylic polymer used.

The melted material leaving the extruder is preferably cooled on a cooling belt and spread using cooled steel cylinders.

In the case of the powder formulation, the material is cooled to below 35° C. and then flaked by means of an ordinary pin-type flaking machine.

Then the material, in the form of flakes, is ground using different mechanical systems including pin crushers.

An essential condition which characterizes and distinguishes the semifinished product is that the grinding operation is performed using cryogenic systems at operating temperatures of less than 20° C.

The grinding operation require the introduction of anti-caking and fluidizing agents, such as silicon dioxide and aluminium oxide powders, in an amount equal to less than 0.5%.

In the case of a granular formulation, on the other hand, the melted material leaving the extruder is conveyed into a die from where it is drawn with a constant cross-section and is cooled and granulated by means of a wet method using a water jet cutting action. Preferably the granules are produced by means of a water jet cutting granulator of the type produced by Gala Industries Inc. and described in international patent application WO 01/21371, incorporated herein by way of reference.

Drying of the granules may be performed by means of simple ventilation and also may be speeded up using centrifuges and filtration; in the preferred embodiment of the invention, in the case where the granulation step is performed by means of the abovementioned water jet cutting granulator, the granules are separated by the water on a vibrating screen and then dried on a spiral elevator.

According to a further aspect of the invention, the granule formulation thus obtained may be transferred to the grinding stage in order to produce a powder formulation.

In particular, in the case of formulations based on organic pigments, an aqueous solution of the dispersant is prepared (the water is preferably used in a quantity of between 10 and 20% relative to the total weight of the formulation); the resin is introduced into the mixer (preferably an open vessel high speed blade type) and is wetted with a quantity of about 50% of said solution; the pigment is introduced during mixing and the remaining amount of aqueous solution is added; the inert filler is added and, after mixing, the product is discharged and then transferred to the extruder.

Mixing, both in the case of organic pigments and in the case of inorganic pigments, is normally performed at a speed of between 800 and 2200 rpm.

Use of the Invention in Powder Paints

The coating according to the present invention may be advantageously used in powder paint formulations, as an alternative to pure pigments which are not pre-coated. Their use ensures colour development and batch to batch colour reproducibilty of the colouring system and a reduction in the quantity of pigment originally used due to the higher colorimetric yeld that precoated pigments have.

Use of the Invention in Liquid Paints Both Using Organic Solvent and/or Water Phase The coating according to the present invention may be advantageously used in formulations of liquid paints, after dilution in solvent or solvent based resins or in water with basic pH, or in water based resins both solution, emulsion or dispersion type.

The pre-dilution methods may be direct, such as mixing with helical vanes as well as energy transfer by means of an increase in the specific surface area and using balls of a different nature and size.

The pastes thus obtained may be used as semifinished products suitable for the production of liquid paints.

The coating, according to the present invention, may be used without pre-dilution for colouring or tinting by means of simple addition to paints followed by dissolution both using direct means, such as helical vanes, and by means of energy transfer via an increase in surface area and using balls of varying nature and size.

The coating according to the present invention is preferably used in formulations containing a monopigment and may be lined with acrylic.

The preparation process is such that this coating is obtained by means of extrusion of the resinous part onto the pigment using a hot process, at a temperature 5-20° C. higher than the polymer melting temperature and followed by cooling in a thin layer using a belt and cooling cylinder.

It has been found in practice that the invention fulfils the task and achieves the predefined objects.

It has in fact been possible to provide a coating which is able to make up for the lack of standardization of the elements which are added when melting the polymer of the powder paints, during extrusion in order to incorporate the solid pigments.

The coating according to the present invention allows the production of coloured powder paints, with a high degree of quality consistency, which is no longer dependent upon the environmental conditions in which the process of incorporating the pigment in the resin is performed, but is only the result of parameters which can be managed by the actual extrusion process.

This means that the pre-coated pigment no longer has an influence with the wettability properties of its surface and that the surface tension of the resin is uninfluential for the purposes of the uniformity and chromatic formation of the pigment mixture.

With the coating according to the present invention it is possible to overcome all the difficulties described above since the pre-coated pigment has eliminated all the effects associated with its pigment surface and is practically ready to be used also by means of simple dispersion in a liquid or even better in a solution of resins.

Use of the Invention in Plastics

The monochromatic granulate of pre-coated pigment may be used to colour plastic polymers such as polyethylene, polypropylene, PET, ABS and polystyrene as well as polyurethane elastomers of various formulations. It may be used individually and/or mixed together with other pre-coated pigments in order to produce a given colour.

The metered mixture of various monochromatic granules allows composition of the final colour directly before the feeding step into the extruder which converts the granules of plastic into the melted state for colouring and/or production of the final object.

In other words, the mixture of granules of different monochromatic colour allows the composition of a polychromatic colour by means of simple mixing. Hence it allows the composition of a colouring system based on monochromatic granules so as to obtain colours composed of various monochromatic pigments.

In the plastic polymers sector, which this invention also embraces, hitherto master batches have been used for pigmentation and associated colouring.

These are mixtures of chromatic pigments with resin (similar to the plastic polymer used), extruded and granulated.

These master batches, which are added in a small amount to the plastics before extrusion, pigment the mass of the plastic polymer.

In some specific case of continuous and constant extrusions, always using the same material and same colour, it is possible to pigment the plastic by means of a liquid master batch where the pigment is pulverized in a liquid vehicle, such as plasticizers (polyacid esters).

The latter is fed onto the head of an extruder, before pigmentation by means of extrusion.

Never before has use been made of monopigment granules of pigments pre-coated with acrylic, aldehyde or ketone resins, to be metered before the colouring extrusion of the plastic.

These granules may impart the final colour to the mass, without having to go through the complex preparation procedure involving finished-colour master batches.

The object of the present invention is that of allowing metering of the quantity of pigment already pre-ground and rendering less harmful the handling of the original bare pigments.

Moreover, owing to the great molecular mobility of the acrylic resin based coating, it is possible to achieve the uniform colouring, with monochromatic semifinished products and with the granulates according to the present invention, of plastics, of powder paints and at the same time of liquid both organic solvent or water based paints.

Further characteristic features and advantages of the subject of the present invention will emerge more clearly from an examination of the description of a preferred, but not exclusive embodiment of the invention, illustrated by way of a non-limiting example in the accompanying drawings in which.

Figure 1:
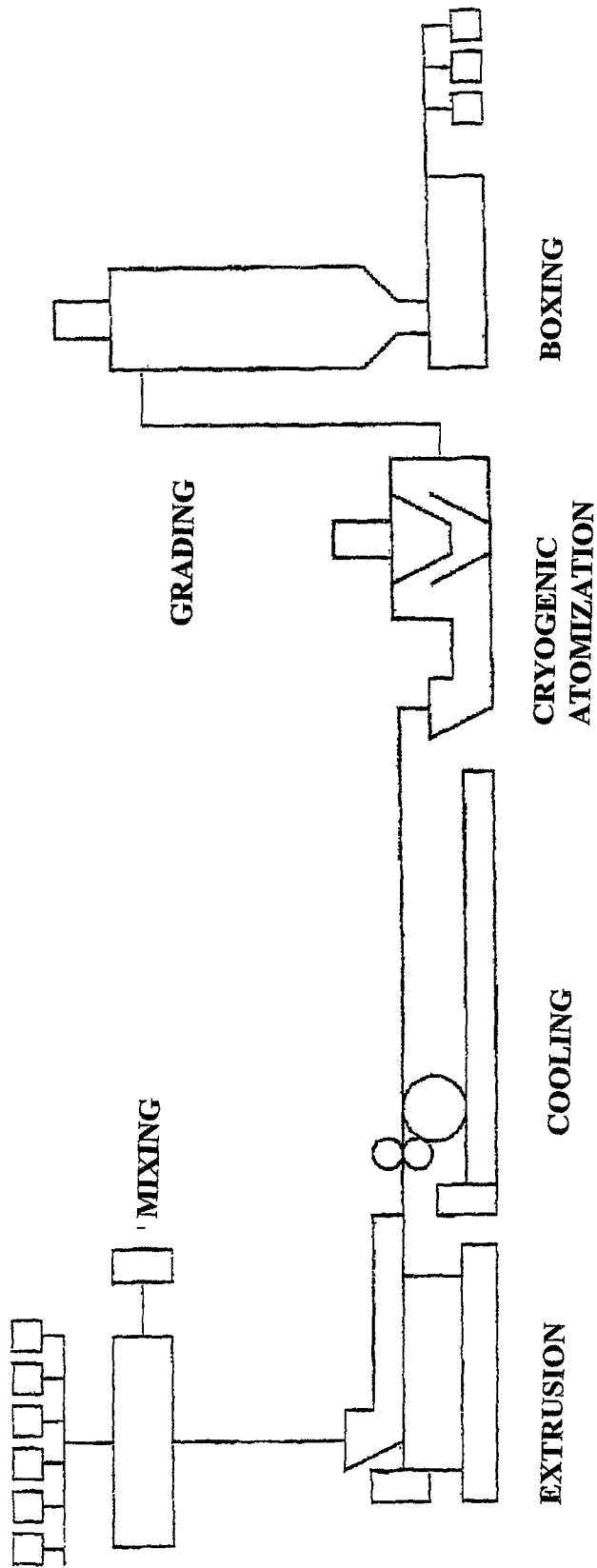
FIG. 1 shows a diagram of a possible plant for the production of the powder coating according to the present invention.
Figure 2:
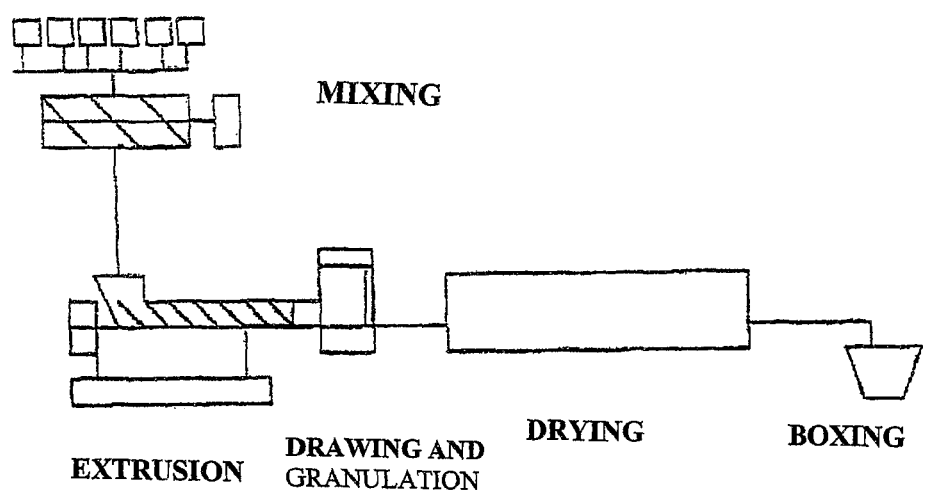
FIG. 2 shows a diagram of a possible plant for the production of the granule coating according to the present invention.

The examples which follow have a purely illustrative and non-limiting function and identify some of the possible mixtures of compounds to be conveyed to the extruder in order to produce subsequently the particle compositions of the invention in both granule and powder form; water must obviously not be regarded as a component of the final formulation since it has been eliminated during drying, and the parts are to be regarded as by weight.

EXAMPLE 1

| | |
|---|---|
| green pigment (based on copper phthalocyanine): | 30 |
| barium sulphate: | 10 |
| Atmer ® 116 (ethoxylated sorbitan ester): | 5 |
| Joncryl ® 67 (acrylic polymer): | 55 |
| water*: | 12 |

EXAMPLE 2

| | |
|---|---|
| black pigment (carbon black): | 25 |
| barium sulphate: | 10 |
| Atmer ® 116 (ethoxylated sorbitan ester): | 2 |
| Joncryl ® 67 (acrylic polymer): | 63 |
| water*: | 14 |

EXAMPLE 3

| | |
|---|---|
| yellow pigment (based on lead sulphochromate): | 60 |
| Joncryl ® 67 (acrylic polymer): | 40 |

EXAMPLE 4

| | |
|---|---|
| blue pigment (based on iron phthalocyanine): | 30 |
| Joncryl ® 67 (acrylic polymer): | 70 |

EXAMPLE 5

| | |
|---|---|
| green pigment (based on copper phthalocyanine): | 30 |
| barium sulphate: | 10 |
| Atmer ® 116 (ethoxylated sorbitan ester): | 5 |
| Joncryl ® 67 (acrylic polymer): | 50 |
| Laropal A 81 (aldehyde resin): | 5 |
| water*: | 12 |

EXAMPLE 6

| | |
|---|---|
| green pigment (based on copper phthalocyanine): | 30 |
| barium sulphate: | 10 |
| Atmer ® 116 (ethoxylated sorbitan ester): | 5 |
| Joncryl ® 67 (acrylic polymer): | 5 |
| Laropal LR 9008 (aldehyde resin): | 50 |
| water*: | 12 |

*The water, which is added to the exemplified compositions before the extrusion, is evaporated during the extrusion and it is not contained in the final product.

The invention claimed is:

1. A method of preparing a water-based paint comprising melting at least one acrylic resin, wherein said resin has an acidity number higher than 30, an average molecular weight of between 800 and 5000 Da and a melting point of between 75° and 130° C.,
    wetting of the entire surface of pigment with the melted acrylic resin,
    extruding the mixture thus obtained, characterized in that extrusion is performed at an internal temperature of the extruder 5 to 20° C. higher than the melting temperature of the resin,
    cooling thereof and subsequent granulation in the wet state and drying, to obtain a granule composition comprising pigments coated with said at least one acrylic resin,
    wherein the granule composition contains from 80 to 20% by weight of said pigment and from 80 to 20% by weight of said acrylic resin,
    wherein the granule composition defines granules having a diameter from 1.0 to 2.2 mm,
    wherein the granule composition is dust-free,
    and adding the obtained granule composition to a water-based formulation having a basic pH.

2. The method of preparing a water-based paint according to claim 1, wherein said resin has an average molecular weight of between 900 and 2000 Da.

3. The method of preparing a water-based paint according to claim 1, wherein said resin has a melting point of between 85° and 120° C.

4. The method of preparing a water-based paint according to claim 1, wherein said resin has an acidity number higher than 100.

5. The method of preparing a water-based paint according to claim 1, wherein said acrylic resin is the poly addition product of styrene, methyl methacrylate, and acrylate monomers.

6. The method of preparing a water-based paint according to claim 1, wherein the water-based paint further comprises at least one aldehyde and/or ketone resin.

7. The method of preparing a water-based paint according to claim 6, wherein said at least one aldehyde and/or ketone resin has an average molecular weight of between 800 and 3000 Da and/or melting point of between 70° and 130° C.

8. The method of preparing a water-based paint according to claim 7, wherein said at least one aldehyde and/or ketone resins has an average molecular weight of between 900 and 1400 Da and/or melting point of between 90° and 110° C.

9. The method of preparing a water-based paint according to claim 1, wherein said pigments are chosen from among organic pigments and inorganic pigments.

10. The method of preparing a water-based paint according to claim 9, wherein said pigments are chosen from among iron oxide pigments, titanium oxide pigments, chromium oxide pigments co-precipitated with nickel and nickel titanates, black pigments from organic combustion, blue and green pigments from copper phthalocyanine, yellow pigments from lead sulphochromate or lead bismuth vanadate, orange pigments from lead sulphochromate molybdate, yellow pigments based on arylamides, orange pigments based on naphthol, orange pigments based on diketo-pyrrolo-pyrrole, red pigments based on manganese salts of azo dyes, red pigments based on manganese salts of beta-oxynaphthoic acid, red pigments based on quinacridone, and red pigments based on anthraquinone or mixtures thereof.

11. The method of preparing a water-based paint according to claim 1, wherein the granule composition consists of 50 to 70% by weight of inorganic pigment and 30 to 50% by weight of resin.

12. The method of preparing a water-based paint according to claim 11, wherein the granule composition consists of 55 to 65% by weight of inorganic pigment and 35 to 45% by weight of said resin.

13. The method of preparing a water-based paint according to claim 1, wherein the granule composition consists of 15 to 40% by weight of organic pigment, 45 to 75% by weight of resin, up to 20% by weight of mineral reinforcing filler, 0.1 to 10% by weight of additives.

14. The method of preparing a water-based paint according to claim 13, wherein the granule composition consists of 20 to 35% by weight of organic pigment, 50 to 70% by weight of resin, 5 to 15% by weight of mineral reinforcing filler, 1 to 7% by weight of additives.

15. The method of preparing a water-based paint according to claim 13, wherein said mineral reinforcing filler is barium sulphate.

16. The method of preparing a water based paint according to claim 13, wherein said additives are chosen from among epoxidized soybean oils and/or sorbitan esters.

17. The method of preparing a water-based paint according to claim 1, wherein said granules have a length of between 1.8 and 8.8 mm.

18. The method of preparing a water-based paint according to claim 1, wherein said granules have a length of between 1.8 and 2.2 mm and diameter of between 1.0 and 1.8 mm.

19. The method of preparing a water-based paint according to claim 1, wherein the granule composition contains from 80 to 1000 granules per gram of composition.

* * * * *